(No Model.)

J. & A. M. CAMPBELL.
SEED DRILL.

No. 545,050. Patented Aug. 27, 1895.

Attest.
Arthur Moore
Samuel M. Quinn

Inventors.
James Campbell
Albert M. Campbell
by James H. Layman
Atty.

UNITED STATES PATENT OFFICE.

JAMES CAMPBELL AND ALBERT M. CAMPBELL, OF HARRISON, OHIO.

SEED-DRILL.

SPECIFICATION forming part of Letters Patent No. 545,050, dated August 27, 1895.

Application filed April 8, 1895. Serial No. 544,934. (No model.)

*To all whom it may concern:*

Be it known that we, JAMES CAMPBELL and ALBERT M. CAMPBELL, citizens of the United States, residing at Harrison, in the county of Hamilton and State of Ohio, have invented certain new and useful Improvements in Drills and Planters; and we do hereby declare the following to be a full, clear, and exact description of the invention, reference being had to the annexed drawings, which form a part of this specification.

The first part of our invention relates to drills, planters, and seeding implements generally, and the improvement comprises a novel combination of devices for effecting a vertical adjustment of the front and rear ends of the cutting-runners applied to the lower ends of the grain-discharge spouts of such implements, the details of said devices being hereinafter more fully described.

The second part of our invention consists in so constructing and arranging a scraper of the driving-wheel as to enable said scraper to serve as a brace that very materially stiffens the rear end of the implement frame, as hereinafter more fully described.

Figure 1:
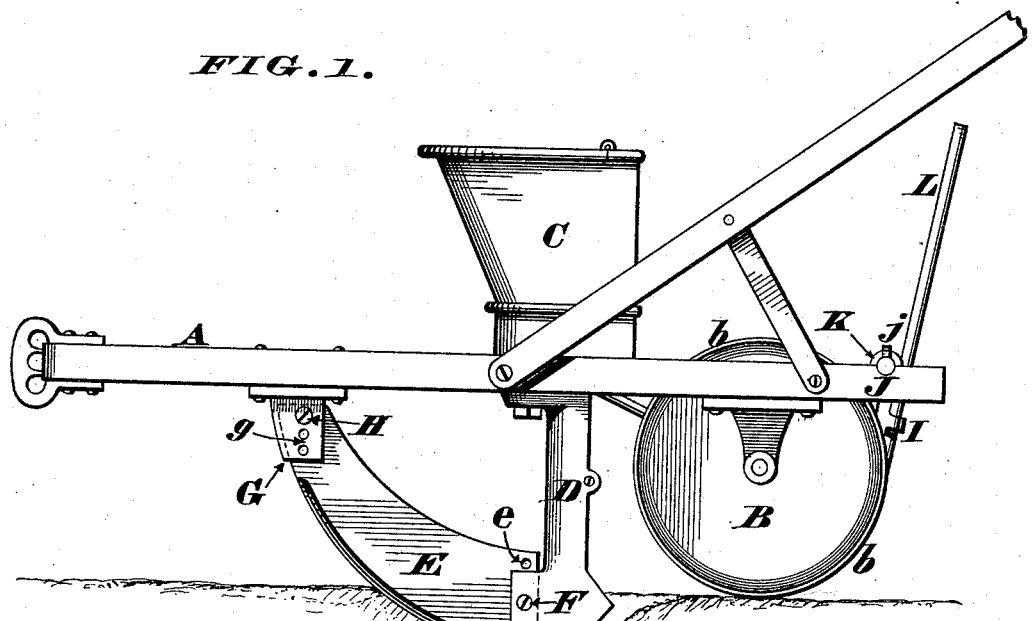
Figure 2:
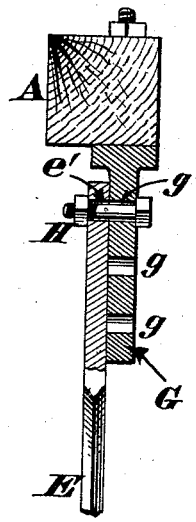
Figure 4:
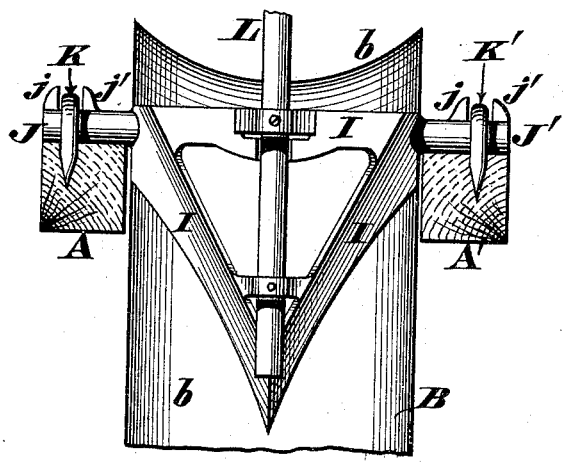
Figure 3:
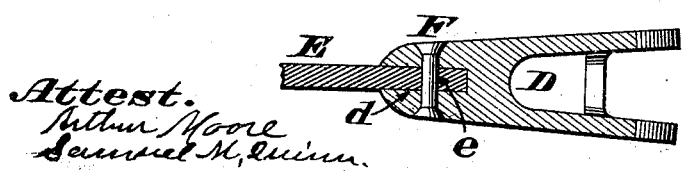

In the annexed drawings, Figure 1 is a side elevation of an implement embodying our improvements. Fig. 2 is an enlarged vertical section through the front portion of the adjustable runner. Fig. 3 is an enlarged horizontal section through the rear portion of said runner. Fig. 4 is an enlarged rear elevation of the upper portion of the driving-wheel and its accessories.

A represents the main frame, B the driving-wheel, and C the box, of any approved form of drill, planter, or other similar seeding implement, a spout D being carried down from said box for the purpose of discharging seed or grain in the usual manner. The lower portion of this spout extends forward, as represented in Fig. 1, converges in that direction, as seen in Fig. 3, and is grooved vertically at $d$ to permit a snug fit of the rear end of a scimiter-shaped blade or runner E, this end of said runner being provided with a series of perforations $e$, through either one of which a bolt, screw, or rivet F is passed. This fastener F connects said runner to the grain-spout and the series of holes $e$ permit considerable vertical adjustment of the blade E, according to the nature of the soil or the peculiar views of the driver. The front and upper end of this blade usually has but a single perforation $e'$, as seen in Fig. 2, the vertical adjustment being effected by a series of holes $g$ in a bracket G, which latter is securely bolted to the beam or frame A. H is a bolt, screw, or rivet that fastens said runner to this bracket.

From the above description it is evident either end of the runner can be adjusted independently of the other end, or the two ends can be shifted simultaneously and uniformly either up or down.

The scraper I (more clearly seen in Fig. 4) is to all intents and purposes the same as that shown in Letters Patent No. 447,938, issued March 10, 1891, to James Campbell, one of the parties to the present application; but in the present case said scraper is furnished with a pair of journals J J', from each of which project a pair of lugs $j j'$.

K K' are staples driven into the beams A A' in such a manner as to permit free swing of the scraper I, while at the same time said staples coact with the lugs $j j' j j'$ in retaining said beams at the required distance to insure a proper turning of the driving-wheel, the face of which is concave, as seen at $b$.

L is a lever for swinging the scraper by hand.

Finally, the feed mechanism at the base of the grain-box C may be operated from the driving-wheel B by the customary shafts, bevel-gears, &c.

We claim as our invention—

1. The combination, in a seeder, of the grain spout D, having a forwardly-converging extension, grooved vertically at $d$; a bracket G, furnished with a series of perforations $g$; a runner E having a hole $e'$, near its front end, and a series of holes $e$ near its rear ends; and fasteners F, H, for securing the runner to said spout and bracket, all as herein described, and for the purpose set forth.

2. A seed-planting implement provided with a swinging scraper I, having journals J, J', and a pair of lugs $j\,j'$, projecting from each journal, in combination with fasteners K, K', applied to the side-bars A, A', of the implement, and fitting between said lugs, which devices J $j\,j'$, J $j\,j'$, K, K', are the sole means for uniting the rear ends of said side-bars, as herein described.

In testimony whereof we affix our signatures in presence of two witnesses.

JAMES CAMPBELL.
ALBERT M. CAMPBELL.

Witnesses:
HARRY O. CAMPBELL,
P. W. FRANCIS.